Aug. 10, 1948.  A. W. MALL  2,446,774
CHAIN SAW
Filed Nov. 15, 1943  3 Sheets-Sheet 1
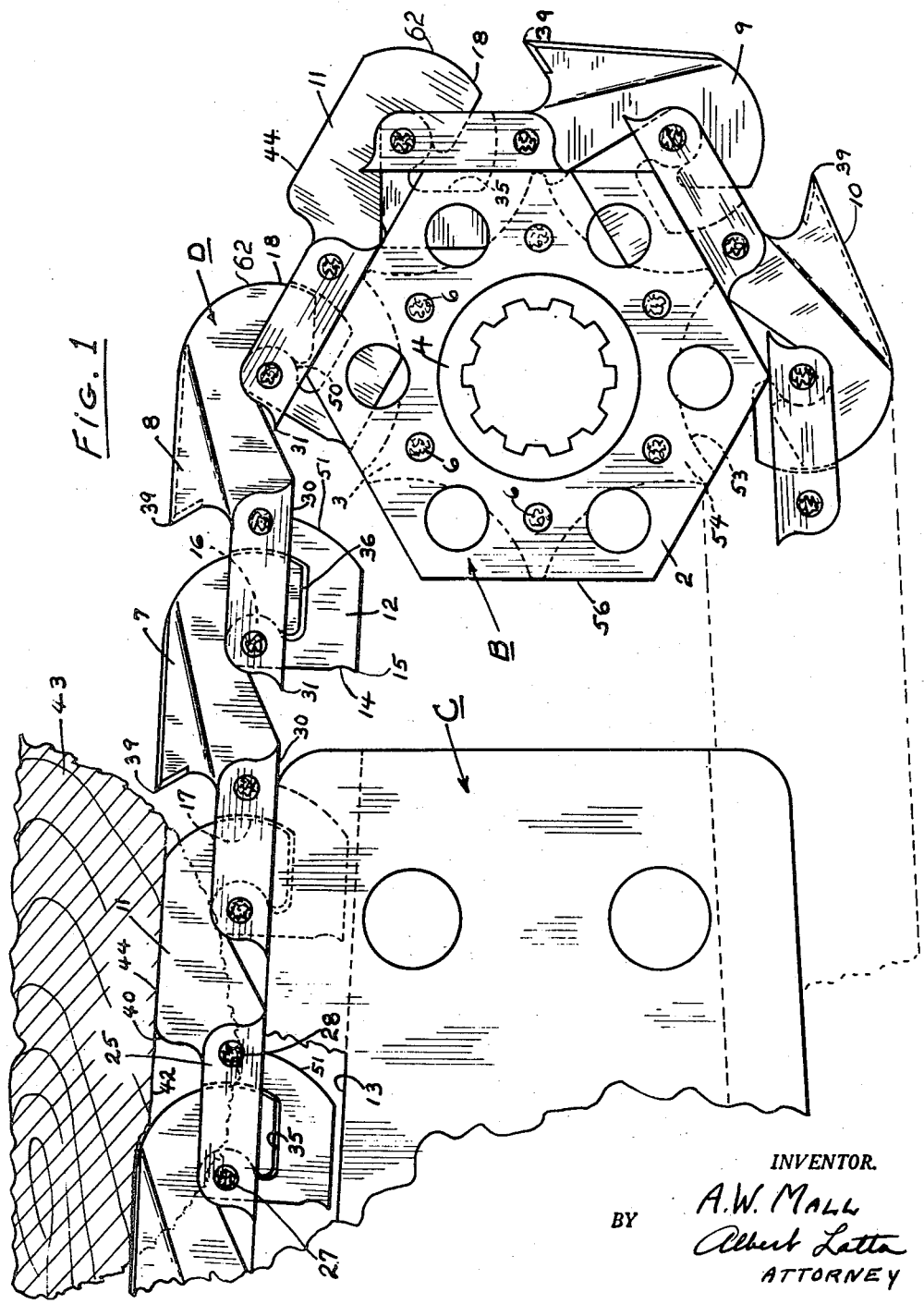
INVENTOR.
A.W. MALL
BY Albert Latta
ATTORNEY Aug. 10, 1948.  A. W. MALL  2,446,774
CHAIN SAW
Filed Nov. 15, 1943  3 Sheets-Sheet 2
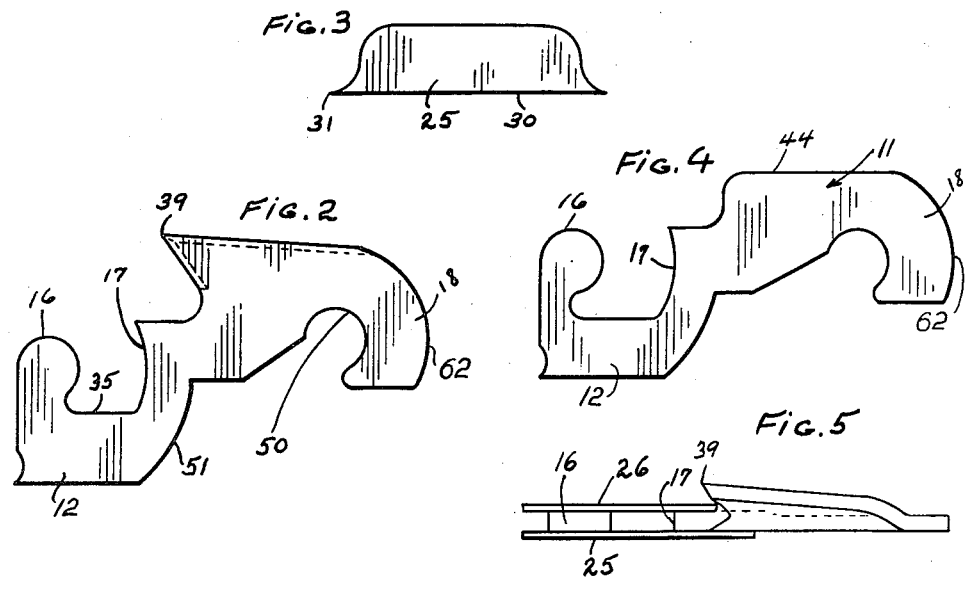
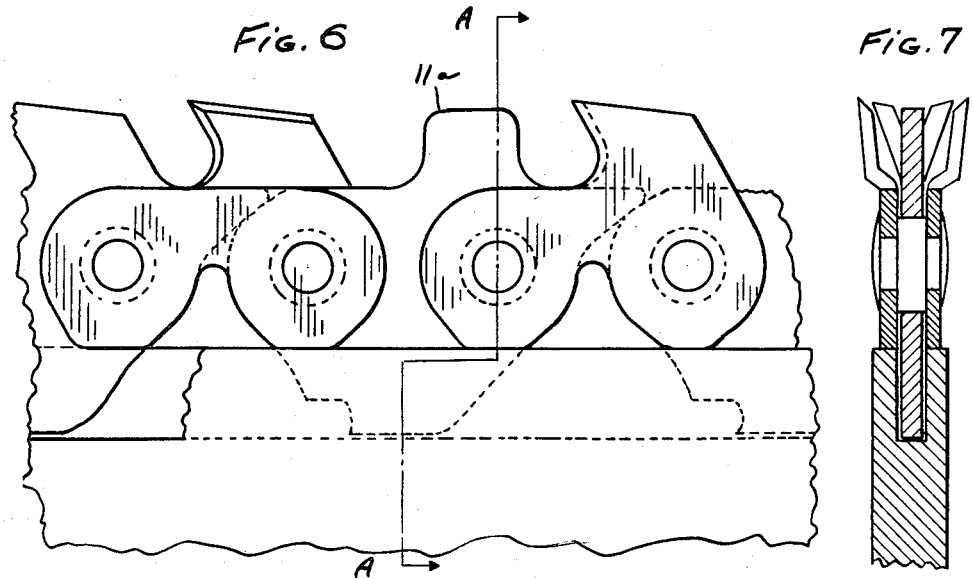
INVENTOR.
A.W. Mall
BY Albert Lalta
ATTORNEY Aug. 10, 1948. A. W. MALL 2,446,774
CHAIN SAW
Filed Nov. 15, 1943 3 Sheets-Sheet 3
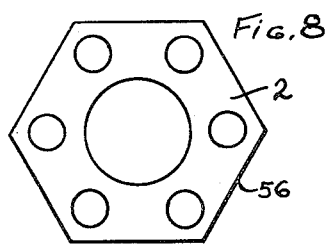
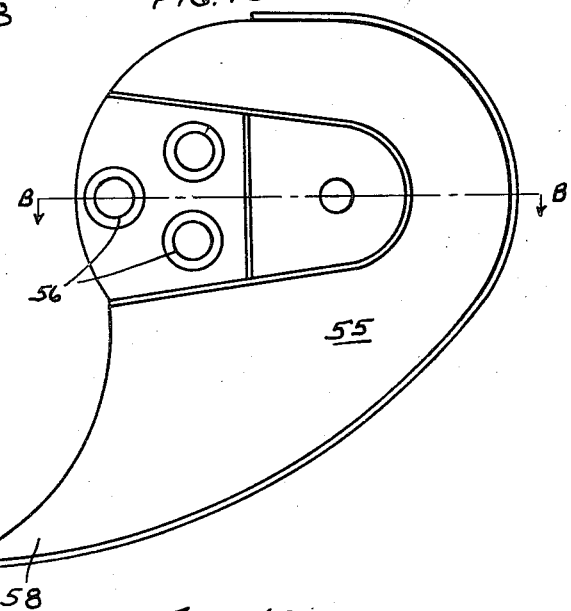
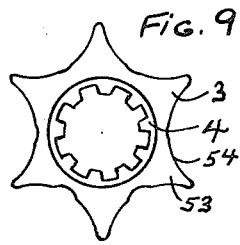
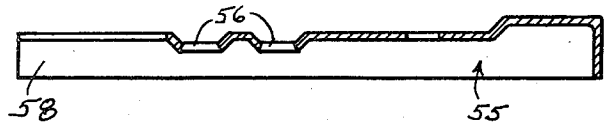
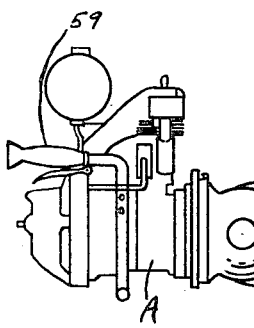
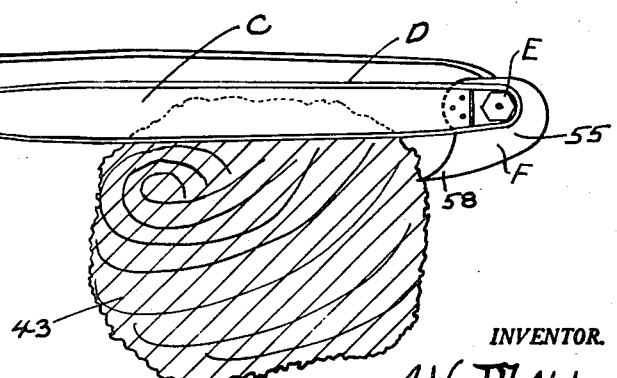
INVENTOR.
A. W. MALL
BY Albert Latta
ATTORNEY Patented Aug. 10, 1948

2,446,774

UNITED STATES PATENT OFFICE 2,446,774

CHAIN SAW

Arthur W. Mall, Flossmoor, Ill., assignor to Mall Tool Company, Chicago, Ill., a corporation of Illinois Application November 15, 1943, Serial No. 510,409

1 Claim. (Cl. 143—32)

This invention relates to woodcutting sawing machines and has as its general objective the provision of an improved cutting chain and driving sprocket therefor, and the provision of a new method for cutting logs.

In particular one object of my invention is to provide a cutting chain having a guage tooth which controls the cutting action of the chain.

A second object of my invention is to provide a cutting chain with cutting teeth spaced in such a manner as to provide ample chip carrying space within the cutting chain.

A third object of my invention is to provide a cutting chain which has long wearing life due to the increased bearing surfaces provided on the cutting chain.

A further object of my invention is to provide a sprocket which serves to take up chain slack during operations of the wood cutting machines.

Another object of my invention is to provide a smoother and freer cutting chain as a result of the manner in which the chain teeth are connected together.

A further object of my invention is to provide a cutting chain having scraping means for scraping and cleaning the guiding plate around which the cutting chain travels.

A still further object of my invention is to provide a cutting chain which prevents the cutting teeth from kicking up about their pivots.

A further object of my invention is to provide a locking means to prevent the cutting teeth from kicking back about their pivots.

A further object of my invention is to provide a thin chain guiding plate so as to permit greater chip gathering space while cutting the log.

Another object of my invention is to provide a hooking device for gripping a log while cutting said log.

Further objects and advantages of my invention will become apparent upon reading the following specification and upon examination of the drawings in which:

Fig. 1 is a fragmentary detail view of a wood cutting machine showing my new cutting chain and driving sprocket therefor;

Fig. 2 is a detail view of one of the cutting teeth;

Fig. 3 is a detail view showing the connecting link forming a part of the cutting chain;

Fig. 4 shows the guage tooth;

Fig. 5 is a plan view showing the connecting links as welded to the cutting tooth;

Fig. 6 shows a modification of my cutting chain with a modified guage tooth;

Fig. 7 is a section view taken on line A—A of Fig. 6;

Fig. 8 is a detail view of one of the sprocket plates;

Fig. 9 is a detail view of the central sprocket plate;

Fig. 10 is a detail view of the log gripping hook;

Fig. 10a is a plan view of the log gripping hook taken on line B—B of Fig. 10; and Fig. 11 is a side elevation view of a chain saw machine employing my log gripping hook.

In general I have provided a power unit A, a driving sprocket B, driven by the power unit, a chain guiding plate C, a cutting chain D trained about the chain guiding plate C, an idler sprocket E, and a log gripping hook F.

Referring to Fig. 1 of the drawings the driving sprocket B is comprised of a pair of hexagonal plates 2 embracing between them a third plate 3 which is provided with six sprocket teeth and a sprocket hub 4 into which the engine shaft extends so as to establish driving engagement with the driving sprocket B. The sprocket plates 2 are rigidly secured to the sprocket 3 by being spot welded at 6 thereto.

The cutting chain D as shown in Fig. 1 is comprised of five different type of teeth consisting of right and left raker teeth 7 and 8 respectively, right and left cutter teeth 9 and 10 respectively and a guage tooth 11, the function of which will be hereinafter described. Each of the raker, cutter and guage teeth are of the same general construction as may be viewed in Figs. 2 and 4; that is each of these has an underlying tongue 12 which rides in a slot 13 in the chain guiding plate C. It will be noted that the front wall of each tongue has a rounded out portion 14 terminating in a pointed nose 15. The nose 15 serves to scrape out any tree sap, chips or other foreign matter which accumulate in the guide plate slot 13. Likewise each tooth has a circular pivotal portion 16 which serves as a pivot for the preceding tooth. Each tooth is also provided with an annular slot 17 extending into the tongue 12 which serves to receive a corresponding annular tail portion 18 formed at the rear end of each tooth. It will be noted that the cutting chain is assembled together by merely inserting the tail portion of each tooth into the annular slot of each succeeding tooth.

It is to be noted that the annular tail portion of each tooth cannot be withdrawn from the annular slot in the tongue of the succeeding tooth except by rotating the tail portion 18 about the pivot 16 a distance of about 45 degrees. Consequently when the chain teeth are assembled together, they will remain assembled. When the cutting chain travels about the sprocket B, the tail portion 18 encircles the pivot 16 of the succeeding tooth sufficiently so as to prevent disengagement from the said succeeding tooth. While the chain is being operated it is under tension thereby preventing any tendency for the teeth to become disengaged while traveling around the sprocket.

One important advantage of providing a cutting chain with links that can be readily assembled and disassembled is that the sequence of the teeth which make up the chain can be changed while on the job, that is, if the sawing machine were being used in a forest away from a repair shop, and it was desired to change the sequence of the cutting teeth, this could be accomplished easily by merely removing the chain from the sawing machine and rearranging or replacing the teeth at will.

It is significant to note that by changing the sequence of the teeth of the cutting chain, the cutting action of the chain may be improved, the factors to be taken into consideration being the hardness of the log cut or the diameter of the log being cut.

Each tooth is provided with a pair of link members 25 and 26 opposing each other on either side of each tooth. These link members are spot welded at 27 and 28 so as to be rigidly secured to each tooth.

They serve several functions as follows; each link member has an elongated sled runner surface 30 terminating in a pointed nose 31. The elongated sled runner surface 30 rides on the edges of the guide plate C while depending tongues 12 ride in the guide plate slot 13. It will be noted that the sled runner surfaces 30 of each link member provide ample bearing surface for riding on the guide plate thereby assuring long wearing life of the link members. The pointed nose 31 of each link member serves to scrape off any foreign matter which tends to accumulate on the edges of the guide plate. I have shown only a portion of the guide plate C in Fig. 1 and it is significant to note that the guide plate C may be from 2 to 7 or 8 feet in length depending upon the size logs or trees to be cut.

Each pair of link members 25 and 26 also serve to provide side walls for the rear tail portions 18 thereby preventing side play of said tail portions. It is significant at this point to note that the elements of my invention as disclosed in Figs. 1, 2, 3, 4, 5, 6, and 7 are twice actual size. The dimensions of my cutting chain may, however, be increased proportionately in event my chain saw machine is used for cutting kerfs in a strata of coal as distinguished from cutting wood logs and trees.

It is significant that the annular slot 17 in each depending tongue 12 terminates with a base 35 which limits the rotative movement of the teeth about their pivots 16 in reverse direction. The base 35 is located a few thousandths of an inch below the underneath edge 36 of each tail portion 18 when the cutting chain as a unit is in its normal operating condition (normally the cutting chain moves in a rectilinear direction except when traveling around the sprockets). When cutting a log or a tree it is desirable to maintain as true rectilinear movement of the cutting chain as possible to assure smooth and free cutting. By referring to true rectilinear movement of the cutting chain I mean that each individual tooth should remain in a substantially constant position relative to the preceding and succeeding teeth while passing through the kerf of the log being cut. The ideal position of each tooth while cutting would be such that if a line were drawn through the axis of each pivot 16 of each tooth, the line would be a straight line. If, however, while cutting a log one or more of the cutting teeth 7 and 8 should kick backwardly about pivots 16 when the cutting points 39 engage the wood being cut, then the cutting chain becomes "jumpy" and the kerf being cut in the log is ragged and uneven. Three important features of my invention eliminate this "jumpiness" or kicking up the teeth and thereby assure a smooth and free cutting chain. The base 35 of each depending tongue 12, as previously pointed out, limits the rotative movement of the tail 18 in reverse direction about pivot 16 as a result of the bottom edge 36 of the tail 18 coming into contact with the base 35. This definitely curtails the tendency of the cutting teeth to kick up when engaging the wood. In addition to this, however, I have provided a guage tooth 11 which also functions to prevent "jumpiness" in the cutting chain while cutting a log.

It will be noted that the upper surface 44 of the guage tooth 11 is located in a plane which is about 1/32" to 1/16" below the plane defined by the cutting points 39 of the cutting teeth 7 and 8. I do not wish to be limited to any definite dimensions of the guage tooth relative to the cutting teeth. The front end of the guage tooth is provided with a curved surface 40 so that the guage tooth functions in the manner of a sled runner. The upper surface of the guage tooth rides on the bottom of the kerf 42 of the log 43 being cut thereby preventing the cutting points 39 of each cutting tooth from taking too large a "bite," that is, by virtue of the sled runner surface 44 of the guage tooth 11 riding on the bottom 42 of the kerf, the result is that the cutting depth of the cutting tooth is limited and controlled. One important advantage of controlling the cutting depth of the cutting teeth is that this serves to eliminate "jumpiness" in the cutting chain and assures a smooth and free cutting chain and another important advantage is that the cutting angle of the cutting tooth can be decreased, that is, the cutting point 39 can be directed more toward "needle point" sharpness, thereby increasing the effectiveness of the cutting points 39 in severing the wood fibers which make up a wood log. It is known that by decreasing the cutting angle of the cutting point 39, the cutting action of the tooth is increased and likewise the tendency of the tooth to dig into the wood and to take too large a "bite" thereby causing it to kick up about its pivot, is increased. Consequently, the guage tooth permits a decreased cutting angle with corresponding increased cutting action limiting the depth of the "bite" which the cutting tooth takes when it engages the wood.

A still further feature of my invention which tends to eliminate "jumpiness" in the cutting chain is the leverage which I obtain between each tooth of the cutting chain. In a co-pending application of A. W. Mall and Walter G. Gorden Serial No. 436,014 (now issued as Patent No. 2,409,775, Oct. 22, 1946) I have shown a cutting chain which has pivotal points at the front and rear end of each tooth. In my present invention there is only one pivotal point 16 for each tooth, thus the increased leverage which is obtained as a result of the increased distance between each pivotal point of the chain tends to greatly decrease the tendency of each tooth to kick up while cutting through the log.

It has been previously mentioned herein that the tail portion 18 cannot be withdrawn from the annular slot 17 except by rotation of the tail portion 18 about pivot 16. The reason for this is that the radius of the arc defined by the inner surface 50 of tail 18 is smaller than the radius of the arc defined by the outer surface 52 of tail 18, both arcs being generated from the same axis. The same is true of the opposing walls of slot 17. Consequently, it is apparent that the lower part of the tail 18 is thicker than the upper part of tail 18, and tail 18 could not be withdrawn from groove 17 except by rotating about pivot 16. This assures that the chain remains assembled after the teeth are assembled together.

The manner in which the chain is driven by the sprocket is significant and is another important advantage of my invention. The rear surface 51 of each depending tongue 12 defines an arc which corresponds with the arc defined by the front surface 54 of sprocket teeth 53 and the front surfaces 54 of sprocket teeth 53 establish driving engagement against the rear surface 51 of each depending tongue 12. In addition to this, however, the periphery 56 of the hexagon shaped outer plates 2 functions in the manner of a socket wrench against opposing link members 25 and 26 and thereby provides additional driving engagement for the cutting chain. An important advantage of the hexagon shaped sprocket is that it takes up chain slack, thereby eliminating the necessity of a spring take-up device as shown in Fig. 1 of my co-pending application, Serial No. 436,014. In other words, when the cutting chain has been operated for sometime, it tends to become loosened relative to the sprockets and guide plate. This looseness or slack is taken up by the hexagon sprocket plates which assume a "sloppy" fit relative to the surfaces 30 of link members 25 and 26—the same type of condition which exists when an oversized socket wrench is applied to a hexagon shaped nut or bolt.

Another feature of my invention resides in my method and apparatus for handling chips cut by the cutting chain while cutting a log. It is of importance to note that the problem of disposing of chips while cutting a log becomes increasingly significant as the diameter of the log being cut increases. In other words in cutting a log 3' in diameter, some of the chips must be carried through the kerf a distance of 3' before being dispelled at the opposite end of the kerf, whereas in cutting a log 1' in diameter the chips need only to be carried 1' at the most before being dispelled from the kerf. Consequently when cutting a large diameter log, it is desirable to arrange for the proper handling of the chips, and one feature of my invention is to provide a method and apparatus for doing this. By providing a cutting chain which may be readily assembled and disassembled and then reassembled, I have made it possible and practicable to remove the cutting chain from the chain sawing machine and rearrange the sequence of the teeth which make up the cutting chain. When cutting a large diameter log, I may remove some of the cutting teeth, 9 and 10 and replace them with raker teeth 7 and 8 or with guage teeth 11. The result of this would be to decrease the amount of cutting done by the chain per lineal foot thereof and increase the amount of chip carrying capacity of the cutting chain. To compensate for the decrease in cutting action of the cutting chain occasioned by the removing of some of the cutting teeth 9 and 10, I may increase the speed of the engine thereby increasing the surface speed and cutting action of the chain.

I likewise may increase the amount of the pitch between each of the cutting teeth, thereby increasing the chip carrying capacity of the chain relative to its surface speed. In addition to this the provision of the guage teeth 11 results in increased chip carrying capacity of the cutting chain.

In a modified form of my invention I have shown a cutting chain in Figs. 6 and 7 which is more suitable for cutting small diameter logs. This chain is provided with a guage tooth 11a which limits the cutting depth of the cutting teeth and thereby affects a smooth cutting chain.

Referring to Figs. 10, 10a and 11 I have shown another feature of my invention consisting of a log gripping hook which permits operating of my chain saw machine by one man. The outer end of my chain saw machine is provided with a casting 55 which is secured to the chain guide plate C through bolt holes 56. Said casting has an elongated hook portion 58 terminating in a chisel shaped edge. Referring to Fig. 11 I have shown how the hook 58 "bites" into the log while cutting same. When using the log gripping hook 58, it is necessary to run the cutting chain in counter clockwise direction thereby causing the hook to be continually urged into gripping contact with the log during cutting operation. While cutting through a log, using the log gripping hook 58, my method is to pull rearwardly on the engine handles 59 thereby pulling the hook 58 into contact with the log. Then the weight of the engine is sufficient to cause the cutting to advance through the log. After the engine has moved downwardly to an angle of about 30 degrees relative to the point where the hook 58 is engaged in the log, then I pull upwardly and with a somewhat quick jerk, force the chain saw forwardly and causing the hook 58 to take a new grip in the log at a lower point on the log. Then the engine is permitted to be lowered again, resuming the cutting operation. This procedure is repeated until the log is cut through.

When felling a standing tree, the hook is engaged in the bark of the tree and the operator grasps the engine handles 59 and proceeds to walk around the tree while the saw is cutting same, the hook 58 remaining in the same location all during the operation of felling the tree.

By referring to Fig. 10a it will be noted that casting 55 is less than ¾" in width, thus when cutting through a log or when felling a tree it is easy to withdraw the saw from the kerf by pulling the saw through the kerf.

Having thus described my invention what I claim is:

A chain saw machine comprising a power unit, a chain guiding member extending therefrom and having a chain sprocket at each end thereof, a cutting chain trained about said guide member and sprockets, a bracket member rigidly secured at the end of the chain guiding member opposite the power unit and enclosing the sprocket and corresponding end of the cutting chain, said bracket member including a plate forming an arcuate wedge shaped hook projecting beyond the cutting plane of the cutting chain and extending toward the power unit, said hook terminating in a chisel shaped edge forming a work gripping member engaging but not substantially penetrating the work, whereupon the machine may be anchored temporarily in the work as the cutting progresses, said plate extending substantially parallel with the path of the cutting chain, the machine being pivotable about said edge as the cut progresses into the work.

ARTHUR W. MALL.

REFERENCES CITED

The following references are of record in the file of this patent:

UNITED STATES PATENTS

| Number | Name | Date |
|---|---|---|
| 74,097 | Kennedy | Feb. 4, 1868 |
| 1,046,800 | Kawasaki | Dec. 10, 1912 |
| 1,107,535 | Martin | Aug. 18, 1914 |
| 1,150,218 | Martin | Aug. 17, 1915 |
| 1,178,362 | Wall | Apr. 4, 1916 |
| 1,239,384 | Gisch | Sept. 4, 1917 |
| 1,342,213 | Hanson et al. | June 1, 1920 |
| 1,601,201 | Daw | Sept. 28, 1926 |
| 1,861,162 | Quist | May 31, 1932 |
| 1,903,571 | Meyer | Apr. 11, 1933 |
| 2,197,211 | Forrest | Apr. 16, 1940 |
| 2,320,082 | Kupka | May 25, 1943 |
| 2,326,854 | Hassler | Aug. 17, 1943 |

FOREIGN PATENTS

| Number | Country | Date |
|---|---|---|
| 12,100 | Great Britain | June 3, 1896 |
| 166 | Great Britain | Jan. 4, 1897 |
| 474,577 | Germany | Apr. 5, 1929 |
| 690,453 | Germany | Apr. 25, 1940 |